(12) United States Patent
Tawada

(10) Patent No.: US 9,134,167 B2
(45) Date of Patent: Sep. 15, 2015

(54) ACOUSTIC APPARATUS

(75) Inventor: Noriaki Tawada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1043 days.

(21) Appl. No.: 13/226,427

(22) Filed: Sep. 6, 2011

(65) Prior Publication Data

US 2012/0063605 A1    Mar. 15, 2012

(30) Foreign Application Priority Data

Sep. 13, 2010 (JP) ................................. 2010-204864

(51) Int. Cl.
   *H04B 15/00* (2006.01)
   *G01H 7/00* (2006.01)
   *H04S 7/00* (2006.01)

(52) U.S. Cl.
   CPC . *G01H 7/00* (2013.01); *H04S 7/305* (2013.01)

(58) Field of Classification Search
   CPC ............. H03G 3/32; H03G 1/00; H04R 3/04; H04R 1/1083
   USPC ............... 381/57, 94.7, 94.9, 103, 96, 108
   See application file for complete search history.

(56) References Cited

U.S. PATENT DOCUMENTS 5,907,624 A * 5/1999 Takada .......................... 381/94.2
8,208,647 B2 * 6/2012 Ahnert et al. .................... 381/59
2009/0193895 A1   8/2009 Date et al.
2010/0303248 A1 * 12/2010 Tawada ........................... 381/56
2012/0063605 A1 * 3/2012 Tawada ........................... 381/56
2014/0192999 A1 * 7/2014 Sannino .......................... 381/92

FOREIGN PATENT DOCUMENTS

JP    2002-330500 A    11/2002
JP    2007-232492 A     9/2007

OTHER PUBLICATIONS

European Search Report dated Nov. 6, 2013 issued in corresponding European Patent Application No. 11180437.3.

* cited by examiner

*Primary Examiner* — Alexander Jamal
(74) *Attorney, Agent, or Firm* — Fitzpatrick, Cella, Harper & Scinto (57) ABSTRACT

Measurement signals for calculating acoustic characteristics of the acoustic space are reproduced in a plurality of periods at sound reproduction intervals. A picked-up signal is acquired by picking up a reproduced signal. The picked-up signal is divided for each period, and the acoustic characteristics of the acoustic space are calculated from an arithmetic unit of the divided periodic signals and the measurement signal. Before sound reproduction, a background noise signal in the acoustic space is measured, and a peak frequency component of a frequency characteristic of the background noise signal is detected. The number of periods and sound reproduction intervals of measurement signals to be reproduced are controlled so as to cancel out a detected peak frequency component at the time of calculating arithmetic unit.

9 Claims, 7 Drawing Sheets

ACOUSTIC APPARATUS

BACKGROUND OF THE INVENTION

1. Field of the Invention

The present invention relates to an acoustic apparatus which measures acoustic characteristics in an acoustic space, a method of controlling the apparatus, and a program.

2. Description of the Related Art

The impulse response between a sound source and a sound receiving point in an acoustic space such as a room or hall includes important information concerning the acoustic characteristics of the space. For example, the user of an acoustic apparatus can obtain an acoustic effect as if he/she were listening to music in a given famous hall by storing the impulse response measured in the hall in the storage unit of the apparatus and performing filtering processing by applying the impulse response to a music signal to be reproduced. In some cases, the user may place a microphone at a listening point in a room where he/she listens to music, and reproduce a measurement sound signal from each speaker to measure the impulse response in that room between each speaker and the listening point.

This impulse response is used to generate a sound field correction filter which flattens the irregularity of the frequency response ("f characteristic") of an impulse response which is generated by the interference between direct sound and reflected sound in a room, especially the peaks and dips of a low-frequency standing wave which exerts a considerable influence on audibility. In addition, it is possible to obtain a clear sound image by performing delay correction for the impulse responses between the respective speakers and the listening point so as to make the rise start times coincide with each other.

As described above, impulse responses are very useful to perform various kinds of acoustic processes in an acoustic apparatus. High importance is therefore attached to a technique of accurately measuring impulse responses, that is, a technique of suppressing the influence of noise on the measurement of impulse responses.

When measuring an impulse response in a room, the S/N ratio of a signal picked up by a microphone deteriorates because background noise always exists in the room. For this reason, Japanese Patent Laid-Open No. 2002-330500 uses a method of deciding the magnitude of a measurement signal by measuring the magnitude of background noise, and then securing a high S/N ratio relative to the background noise.

In order to obtain one impulse response, it is often a case where measurement sound signals are reproduced in a plurality of periods, and an arithmetic mean of the respective periodic signals in the picked-up signals is calculated, thereby reducing background noise and securing a high S/N ratio. Generally, the intervals at which measurement signals are reproduced are constant, and synchronous addition aims at reducing the random noise components of background noise. According to Japanese Patent Laid-Open No. 2007-232492, the intervals at which measurement sound signals are reproduced are changed at predetermined time intervals to reduce random noise by calculating arithmetic mean of the respective periods and, at the same time, inhibit the generation of frequencies that completely inhibit reductions in components other than random noise.

An actual space such as a room in which an acoustic apparatus is placed includes various noise sources such as an air conditioner, lights, a personal computer, and various kinds of electric appliances and devices. These noise sources generate noise from driving unit (for example, the hard disk, fan, and the like of the personal computer) where electric energy is converted into mechanical motion. For this reason, such noise basically has peak frequency components in narrow bands on the f characteristic. Background noise therefore includes these peak frequency components in addition to random noise components.

Recent acoustic apparatuses have been required to more frequently perform measurement of impulse responses necessary for the design of sound field correction filters as the number of channels of speakers increases and listening areas as correction targets enlarge. This has increased the possibility that various peak frequency components of background noise will mix in the signal picked up by a microphone in accordance with the respective measurement places and measurement timings. In this case, peak frequency components as narrow-band noise are weak in energy. For this reason, besides being accustomed to such sound, it is difficult for the user to perceive them as noise. This makes it difficult to take countermeasures such as eliminating a noise source in advance.

In addition, peak frequency components in a picked-up signal appear when electrical noise having peak frequency components directly mixes in constituent elements of the acoustic apparatus as well as when peak frequency components are picked up as reproduced by the above noise source. With an enlargement of a listening area, in particular, a microphone cable must be routed a long distance, and hence electrical noise picked up by the cable directly appears in a picked-up signal.

As described above, in practice, it is very likely that while peak frequency components as background noise will mix in picked-up signals actually acquired by an acoustic apparatus.

Figure 3A:
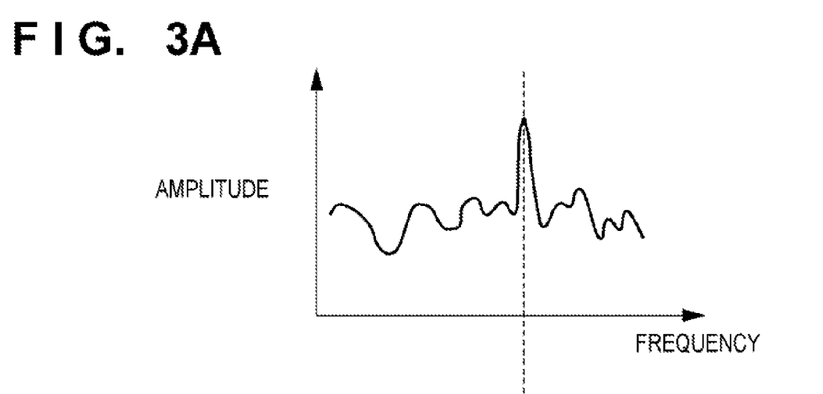
FIG. 3A is a graph for explaining the influence of a background noise peak frequency component on the f characteristic of an impulse response.
Figure 3B:
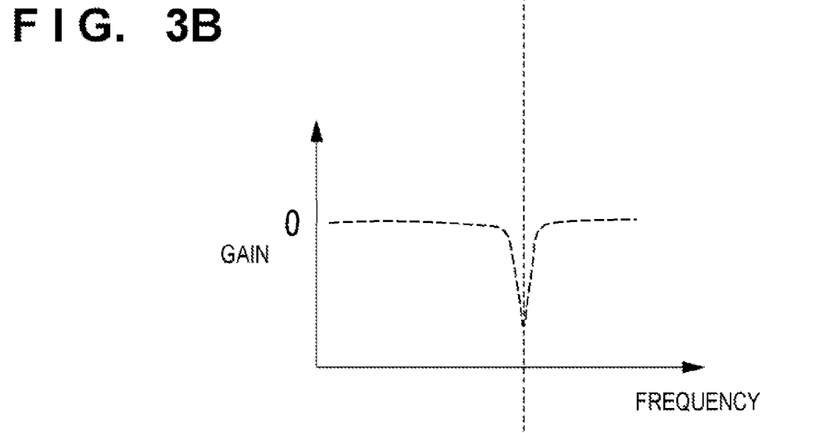
FIG. 3B is a graph for explaining the influence of the background noise peak frequency component on the f characteristic of the impulse response.

When an impulse response is calculated by using a picked-up signal including peak frequency components, since a high S/N ratio cannot be secured near the peak frequency components, a steep peak appears on the f characteristic of the impulse response obtained as shown in FIG. 3A. This peak is not based on the interaction between a speaker which reproduces music signals and the room, and hence should not be corrected by a sound field correction filter. However, when an acoustic apparatus automatically generates a sound field correction filter, it is impossible to discriminate noise as peak frequency components of background noise on the f characteristic. For this reason, for example, a notch filter having an extreme characteristic as indicated by the dotted line in FIG. 3B is generated as one of the constituent elements of a sound field correction filter.

Such a characteristic may affect the overall design of a sound field correction filter. Applying such a filter to the original characteristics based on the interaction between the speaker and the room shown in FIG. 3C will lead to a deterioration in sound quality such as the sound loss of music. That is, peak frequency components themselves are difficult to perceive by the user, but appear as a large peak on the f characteristic of a measured impulse response. For this reason, using an improper sound field correction filter to correct such noise will make the user perceive the peak as a deterioration in sound quality.

As described above, it is important to take countermeasures against peak frequency components of background noise, because they greatly affect the measurement of an impulse response and correction processing performed based on the measurement result.

The method disclosed in Japanese Patent Laid-Open No. 2002-330500, which increases a measurement signal in accordance with the magnitude of background noise, however, uniformly increases the S/N ratio for all the frequency bands. This makes it impossible to secure a satisfactory S/N ratio for peak frequency components of background noise. In addition, forcedly increasing a signal may cause clipping or distortion.

The method disclosed in Japanese Patent Laid-Open No. 2007-232492, which changes the sound reproduction intervals of measurement signals, is free from the problem that arbitrary peak frequency components other than random noise are not reduced at all, unlike the general arithmetic mean in which the sound reproduction intervals of measurement signals are constant. However, this processing does not measure background noise and is not specialized for a specific peak frequency. For this reason, large peak frequency components of background noise remain even after arithmetic mean operation.

SUMMARY OF THE INVENTION

The present invention provides an acoustic apparatus which can acquire an accurate impulse response by controlling the sound reproduction intervals of measurement signals, in accordance with peak frequencies of background noise, in impulse response measurement.

The present invention its first aspect provides an acoustic apparatus arranged to calculate acoustic characteristics of an acoustic space, the apparatus comprising: a speaker unit arranged to periodically reproduce measurement sound signals for calculating acoustic characteristics of the acoustic space at sound reproduction intervals; a sound pickup unit arranged to acquire a picked-up signal by picking up a signal reproduced by the speaker unit; a calculation unit arranged to divide the picked-up signal for each period and calculate acoustic characteristics of the acoustic space from an arithmetic unit of the divided periodic signals and the measurement signals; a detection unit arranged to measure background noise in the acoustic space via the sound pickup unit before sound reproduction by the speaker unit and detect a peak frequency component of a frequency characteristic of the background noise signal; and a control unit arranged to control the number of periods and sound reproduction intervals of measurement sound signals reproduced by the speaker unit so as to cancel out a peak frequency component detected by the detection unit at the time of calculating arithmetic unit.

The present invention its second aspect provides a method of controlling an acoustic apparatus which calculates acoustic characteristics of an acoustic space, comprising: a sound reproduction step of causing a speaker unit to periodically reproduce measurement sound signals for calculating acoustic characteristics of the acoustic space at sound reproduction intervals; a sound pickup step of causing a sound pickup unit to acquire a picked-up signal by picking up a signal reproduced in the sound reproduction step; a calculation step of causing a calculation unit to divide the picked-up signal for each period and calculate acoustic characteristics of the acoustic space from an arithmetic unit of the divided periodic signals and the measurement signals; a detection step of causing a detection unit to measure background noise in the acoustic space in the sound pickup step before sound reproduction in the sound reproduction step and detect a peak frequency component of a frequency characteristic of the background noise signal; and a control step of causing a control unit to control the number of periods and sound reproduction intervals of measurement sound signals reproduced in the sound reproduction step so as to cancel out a peak frequency component detected in the detection step at the time of calculating arithmetic unit.

The present invention its third aspect provides a program for causing a computer to function as an acoustic apparatus which calculates acoustic characteristics of an acoustic space, by causing the computer to function as a speaker unit arranged to periodically reproduce measurement sound signals for calculating acoustic characteristics of the acoustic space at sound reproduction intervals; a sound pickup unit arranged to acquire a picked-up signal by picking up a signal reproduced by the speaker unit; a calculation unit arranged to divide the picked-up signal for each period and calculate acoustic characteristics of the acoustic space from an arithmetic unit of the divided periodic signals and the measurement signals; a detection unit arranged to measure background noise in the acoustic space via the sound pickup unit before sound reproduction by the speaker unit and detect a peak frequency component of a frequency characteristic of the background noise signal; and a control unit arranged to control the number of periods and sound reproduction intervals of measurement sound signals reproduced by the speaker unit so as to cancel out a peak frequency component detected by the detection unit at the time of calculating arithmetic unit.

As described above, according to the present invention, controlling the sound reproduction intervals of measurement signals, in accordance with peak frequencies of background noise, in impulse response measurement can obtain an accurate impulse response by canceling out peak frequency components at the time of arithmetic mean operation.

Further features of the present invention will become apparent from the following description of exemplary embodiments (with reference to the attached drawings).

DESCRIPTION OF THE EMBODIMENTS

The embodiments of the present invention will be described in detail below with reference to the accompanying drawings. The arrangements described in these embodiments are merely examples, and the present invention is not limited to those shown in the accompanying drawings.

First Embodiment

Figure 1:
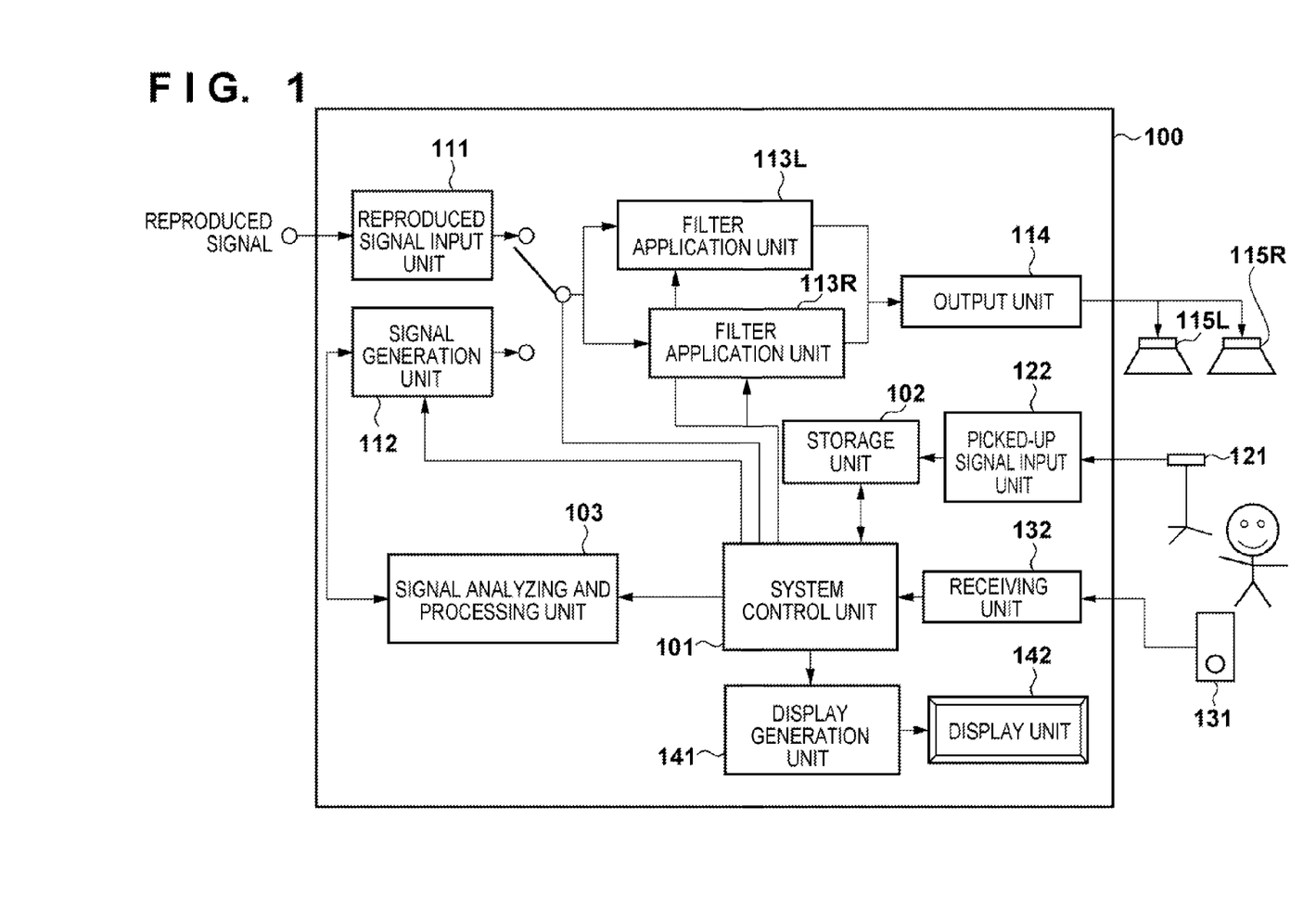
FIG. 1 is a block diagram showing the arrangement of an acoustic apparatus according to the first embodiment of the present invention.

FIG. 1 is a block diagram showing the arrangement of an acoustic apparatus according to the first embodiment of the present invention.

The acoustic apparatus shown in FIG. 1 includes a controller 100 as a main unit. The controller 100 includes a system control unit 101 which performs overall control of the apparatus, a storage unit 102 which stores various data, and a signal analyzing and processing unit 103 which analyzes and processes a signal. Elements that implement the function of a reproduction system include a reproduced signal input unit 111, a signal generation unit 112, filter application units 113L and 113R, an output unit 114, and speakers 115L and 115R as sound sources. Elements which implement the function of a sound pickup system include a microphone 121 and a sound pick-up signal input unit 122.

As elements for accepting command inputs from the user, this apparatus further includes a remote controller 131 and a receiving unit 132. Elements for presenting information to the user include a display generation unit 141 and a display unit 142. Although not shown to avoid crowding, assume that the signal analyzing and processing unit 103, the signal generation unit 112, the filter application units 113L and 113R, and the display generation unit 141 are connected to the storage unit 102.

Note that various constituent elements of the acoustic apparatus in FIG. 1 may be implemented by using all or some of the functions of various constituent elements of a general-purpose computer, such as a CPU, ROM, and RAM or may be implemented by hardware or software or a combination of them.

The reproduced signal input unit 111 receives a reproduced signal from a sound source reproduction apparatus such as a CD player. If the reproduced signal is an analog signal, the reproduced signal input unit 111 A/D-converts the signal for subsequent digital signal processing. As a signal to be transmitted to the filter application units 113L and 113R, one of the following signals is selected: a reproduced signal from the reproduced signal input unit 111 and the signal generated by the signal generation unit 112. The signal filtered by the filter application units 113L and 113R is transmitted to the output unit 114, in which the signal is D/A-converted and amplified. Thereafter, the speakers 115L and 115R reproduce sound. In this case, the speakers 115L and 115R can reproduce measurement signals in a plurality of periods, at sound reproduction intervals, to calculate the acoustic characteristics of the acoustic space under the control of the system control unit 101.

Note that when using active speakers, the output unit 114 and the speaker 115L are combined into one element, and so are the output unit 114 and the speaker 115R. The sound pick-up signal input unit 122 receives a signal picked-up from a microphone 121, and amplifies then A/D-converts the signal for subsequent digital signal processing. In this case, the microphone 121 and the remote controller 131 may be integrated into one input device. The display unit 142 need not always be built in the controller 100 in the form of a display panel or the like. It is possible to connect an external display device such as a display to the controller 100.

The following will describe a function of the acoustic apparatus as an example of the present invention, which serves as a function of performing countermeasure processing against background noise peak frequency components in the measurement of an impulse response as acoustic characteristics, assuming a case in which sound field correction (sound field adjustment) is performed in an acoustic space.

First of all, the user transmits a command to "start sound field correction" to the controller 100 with the remote controller 131. The receiving unit 132 receives the command. The system control unit 101 interprets the command. The display generation unit 141 generates information corresponding to the current state of the sound field correction sequence. The display unit 142 displays the information to present it to the user. In this case, the presented information indicates necessary work including, first of all, setting the microphone 121 at a listening point where the user listens to music and pressing the "OK" button of the remote controller 131 at the ready.

In general, the microphone for measurement can be set at a height (about 1 m) where the user, who is in a sitting position, listens to music. Note that it is not always necessary to display all the contents of work on the display unit 142. It is possible to display only minimum necessary information indicating the current state in an easily comprehensible manner and leave a detailed explanation of work to a paper manual or the like. It is not always necessary to visually present information and instructions to the user by using the display generation unit 141 and the display unit 142. It is possible to make the signal generation unit 112 generate speech information indicating the same contents of work and make the speakers 115L and 115R reproduce sound as a voice guidance.

When the user sets the microphone 121 at the listening point and presses the "OK" button of the remote controller 131, the display unit 142 displays the message "measurement will be done at measurement point 1/L" which indicates the measurement of an impulse response between the speaker 115L and the listening point. This apparatus performs countermeasure processing against background noise peak frequency components in accordance with the flowchart of FIG. 2.

Figure 2:
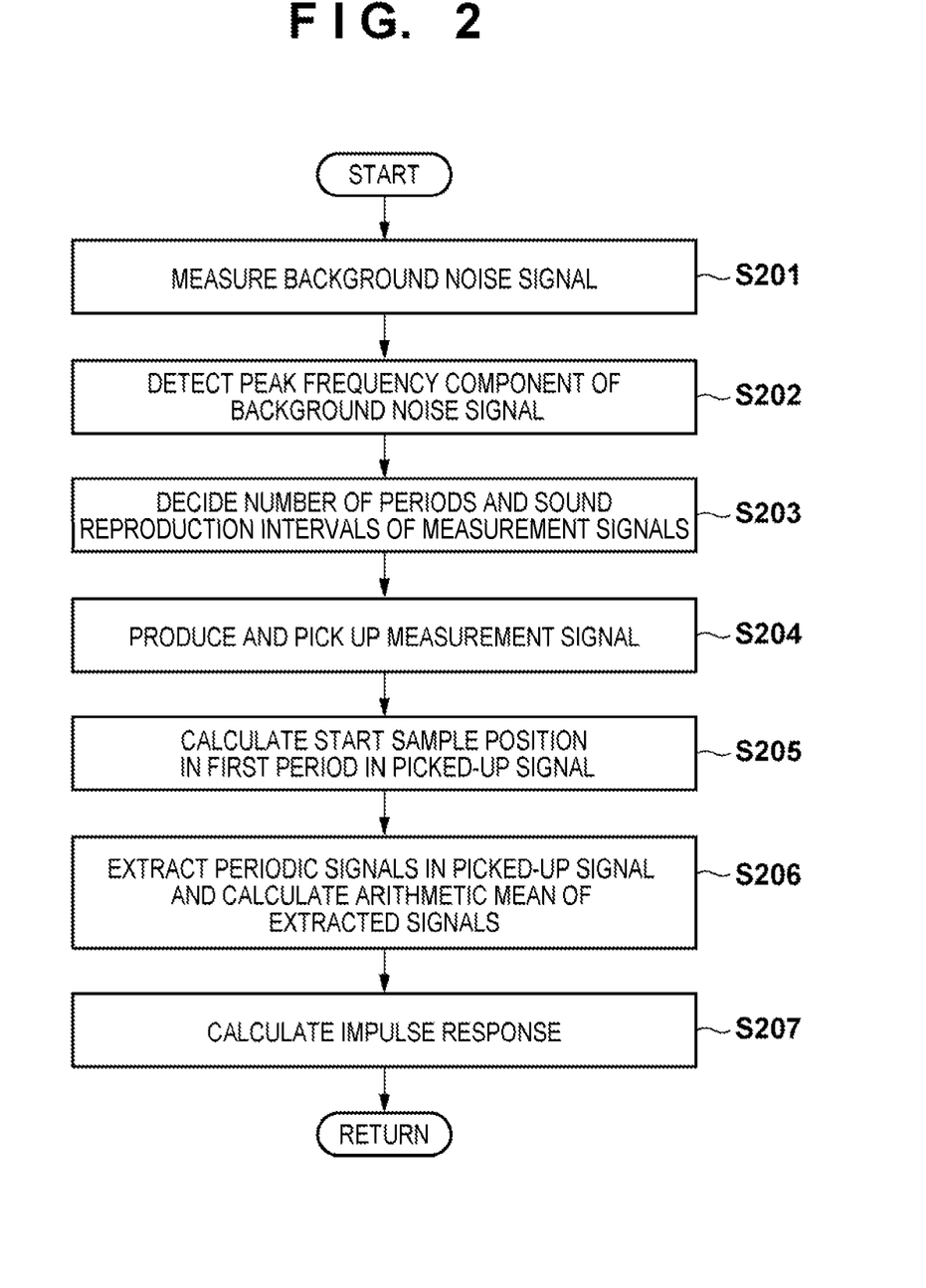
FIG. 2 is a flowchart for countermeasure processing against background noise peak frequency components in the first embodiment of the present invention.

First of all, in step S201, the system control unit 101 measures background noise via the microphone 121 before the sound is reproduced from the speaker 115L. That is, the storage unit 102 stores the sound picked up by the microphone 121 as a background noise signal in response to an instruction from the system control unit 101. In this case, the minimum necessary length of a background noise signal is determined by a desired frequency resolution. For example, when the frequency resolution is set to 0.5 Hz, a background noise signal having at least a length of 2 s is required.

The signal analyzing and processing unit 103 and the storage unit 102 perform the processing in step S202 and the subsequent steps in cooperation with each other.

In step S202, the signal analyzing and processing unit 103 detects peak frequency components from the background noise signal acquired in step S201. Although a detailed description of detection of peak frequency components of a background noise signal will be omitted because this is a general technique, peak frequency components can be detected by the following processing. First of all, the signal analyzing and processing unit 103 obtains the f characteristic of background noise by performing fast Fourier transform (FFT) with a size corresponding to a desired frequency resolution. The signal analyzing and processing unit 103 then performs octave smoothing of the f characteristic with a wide octave width (for example, a width of two octaves) to obtain a moderate approximate shape of the f characteristic of background noise. It is possible to determine from this approximate shape that frequencies of the f characteristic of background noise which are equal to or more than a predetermined value (for example, 15 dB) are peak frequencies of the background noise signal.

In general, a frequency range to be subjected to sound field correction is about 20 to 20 kHz in consideration of the low-frequency reproduction ability of the speakers and the frequency characteristic of the microphone. Even if the f characteristic of an impulse response is influenced by the peak frequency components of a background noise signal outside this band, no problem arises unless peak frequency components fall within the target frequency range of sound field correction. It is therefore possible to exclude those of the peak frequencies which fall outside the range of 20 to 20 kHz.

In step S203, the signal analyzing and processing unit 103 decides the number of periods and sound reproduction intervals of measurement signals to be reproduced in step S204 based on the peak frequencies of the background noise signal detected in step S202. The idea described in detail below is the main point of the present invention.

Figure 4A:
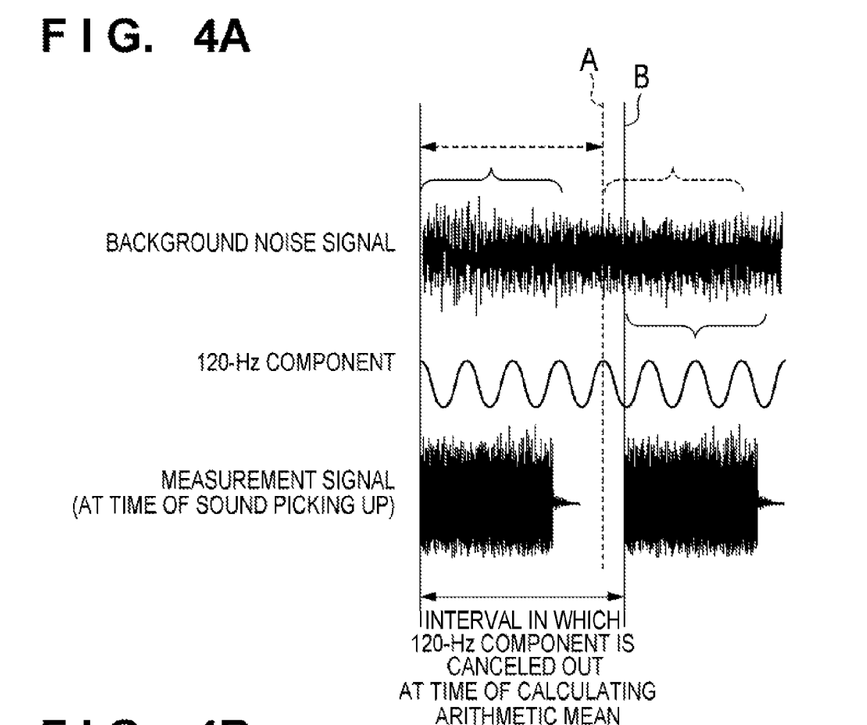
FIG. 4A is a graph for explaining the basic principle of the present invention.
Figure 4B:
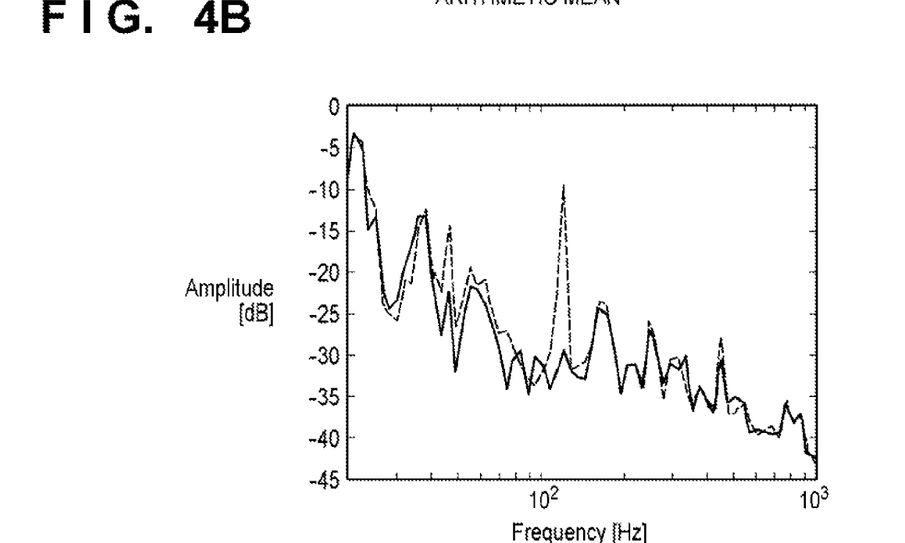
FIG. 4B is a graph for explaining the basic principle of the present invention.

The basic principle will be described first with reference to FIGS. 4A to 4C. When background noise is measured in an actual room, a background noise signal like that shown in FIG. 4A is measured. This background noise signal includes a 120-Hz frequency component emitted from the hard disk (7,200 rpm, that is, 120 revolutions per sec) of a personal computer located near the apparatus. The dotted line in FIG. 4B indicates the f characteristic obtained by dividing a background noise signal twice with the same length at a proper interval and calculating arithmetic mean of the resultant signals. In this case, for the sake of viewability, octave smoothing with a width of 1/12 octave is done. However, a steep peak can be seen at 120 Hz. This is because, as indicated by a dotted line A in FIG. 4A, 120-Hz components in the two signal portions extracted at the random interval are almost in phase and have hardly been attenuated by arithmetic mean operation.

As indicated by a solid line B in FIG. 4A, this apparatus divides the background noise signal at intervals that make 120-Hz components in the two signal portions have opposite phases. This makes the 120-Hz components cancel out each other at the time of calculating arithmetic mean. When seeing the f characteristic, as indicated by the solid line in FIG. 4B, the steep peak at 120 Hz is eliminated. That is, reproducing measurement signals in two periods at the sound reproduction interval indicated by the solid line B in FIG. 4A will make peak frequency components of the background noise signal cancel out each other at the time of calculating arithmetic mean.

Figure 5A:
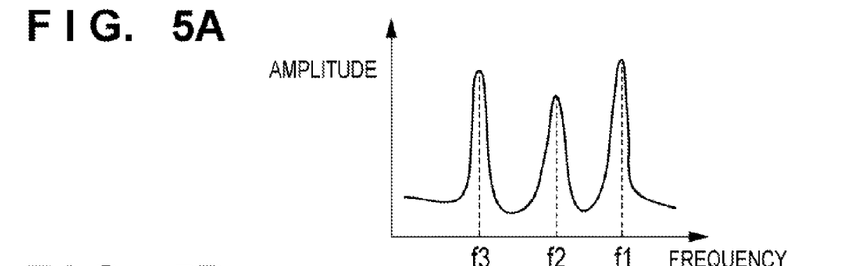
FIG. 5A is a graph for explaining a method of deciding the sound reproduction intervals of measurement signals according to the first embodiment of the present invention.
Figure 5B:
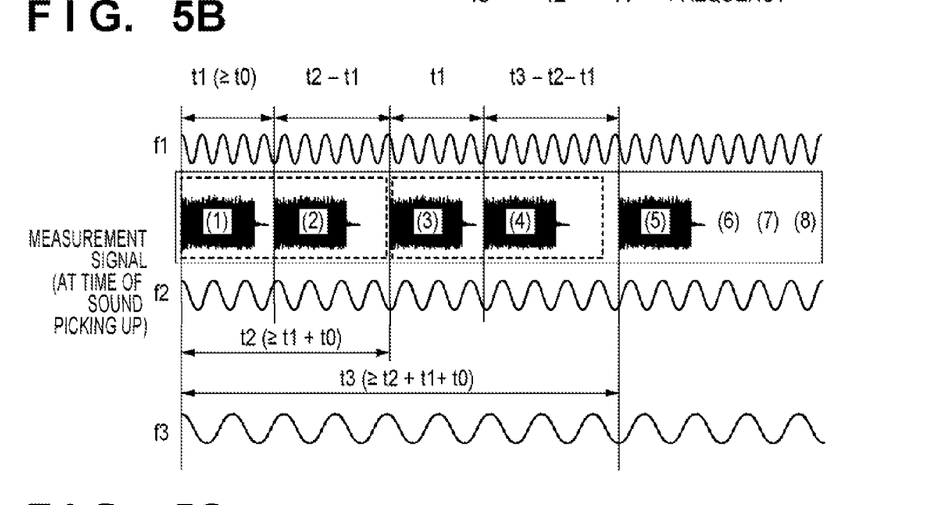
FIG. 5B is a graph for explaining a method of deciding the sound reproduction intervals of measurement signals according to the first embodiment of the present invention.

Based on this basic principle, the above technique is generalized to a case in which there are a plurality of peak frequencies, as shown in FIGS. 5A and 5B. Assume that in the following description, the unit of frequency is [Hz], the unit of sound reproduction interval is [s], and FIGS. 5A and 5B will be referred to.

First of all, consider a case wherein there is only one processing target, that is, a peak frequency $f1$ of the background noise signal schematically shown in FIG. 5A. In this case, as in the case of the basic principle, measurement signals may be reproduced in two periods, and a sound reproduction interval $t1$ between the first and second periods may be set to the minimum value that satisfies the following condition:

$$t1 \geq t0 \text{ and } t1 = (1/f1)/2 \times (\text{odd number}) \tag{1}$$

In this case, $t0$ is the minimum sound reproduction interval necessary to make reverberation in a room cease. Setting the sound reproduction interval to an odd number multiple of the half period of the $f1$ component will cancel out the $f1$ component as a peak frequency component of the background noise signal at the time of calculating arithmetic mean.

Consider next a case in which there are two processing targets, that is, peak frequencies $f1$ and $f2$ of the background noise signal. In this case, assume that measurement signals are reproduced in $2^2=4$ periods. First of all, the sound reproduction interval between the first and second periods is set to $t1$ as in the above case.

A sound reproduction interval $t2$ between the first and third periods is set to the minimum value that satisfies the following condition:

$$t2 \geq (t1+t0) \text{ and } t2 = (1/f2)/2 \times (\text{odd number}) \tag{2}$$

Setting the interval $t2$ to an odd number multiple of the half period of the $f2$ component will cancel out the $f2$ component as a peak frequency component of the background noise signal at the time of calculating arithmetic mean of the two signals generated at the sound reproduction interval $t2$. When $t1$ and $t2$ are set, as is also obvious from FIG. 5B, the sound reproduction interval between the second and third periods is automatically determined as $(t2-t1)$. Assume that the sound reproduction interval between the third and fourth periods is set to $t1$, which is equal to that between the first and second periods. With this operation, of the total of four periods, the first two periods and the second two periods, which are surrounded by the dotted rectangles in FIG. 5B, are represented by similar shapes.

In this case, considering the arithmetic mean of the first to fourth periods, it can be schematically written as $$1+2+3+4 = (1+2)+(3+4) \ldots (\ ) \tag{3}$$

representing a combination with the interval $t1$ $$= (1+3)+(2+4) \ldots (\ )$$

representing a combination with the interval $t2$

That is, since the interval between the first and second periods is set to $t1$, the $f1$ component of the background noise is canceled out at the time of calculating arithmetic mean. Likewise, since the interval between the third and fourth periods is also set to $t1$, the $f1$ component is canceled out. At the same time, since the interval between the first and third periods is set to $t2$, the $f2$ component of the background noise is canceled out at the time of calculating arithmetic mean. In addition, since the interval between the second and fourth periods is also set to $t2$, the $f2$ component is canceled out. Arithmetic mean of the first to fourth periods with the controlled sound reproduction intervals in this manner will clearly cancel out the f1 and f2 components as peak frequency components of the background noise signal.

Likewise, consider a case in which there are three processing targets, that is, peak frequency components f1, f2, and f3 of the background noise signal. In this case, assume that measurement signals are generated in $2^3=8$ periods. First of all, the sound reproduction interval between the third and fourth periods is set to t1 as in the above case.

Subsequently, a sound reproduction interval t3 between the first and fifth periods is set to the minimum value that satisfies the following condition:

$$t3 \geq (t2+t1+t0) \text{ and } t3=(1/f3)/2\times(\text{odd number}) \quad (4)$$

Setting the interval t3 to an odd number multiple of the half period of the f3 component will cancel out the f3 component as a peak frequency component of the background noise signal at the time of calculating arithmetic mean of the two signals generated at the interval t3.

When t1, t2, and t3 are determined, the sound reproduction interval between the fourth and fifth periods is automatically determined as (t3−t2−t1). In addition, the respective sound reproduction intervals from the fifth period to the eighth period are determined such that the first four periods and second four periods of the total of eight periods, which are surrounded by the solid line rectangles in FIG. 5B, are represented by similar shapes. That is, the sound reproduction interval between the fifth and sixth periods is set to t1, the sound reproduction interval between the sixth and seventh periods is set to (t2−t1), and the sound reproduction interval between the seventh and eighth periods is set to t1.

In this case, considering the arithmetic mean of the first to eighth periods, it can be schematically written as $$1+2+3+4+5+6+7+8 = (1+2)+(3+4)+(5+6)+(7+8)\ldots \quad (5)$$
$$(\ ) \text{ representing a combination}$$
$$\text{with the interval } t1$$
$$= (1+3)+(2+4)+(5+7)+(6+8)\ldots$$
$$(\ ) \text{ representing a combination}$$
$$\text{with the interval } t2$$
$$= (1+5)+(2+6)+(3+7)+(4+8)\ldots$$
$$(\ ) \text{ representing a combination}$$
$$\text{with the interval } t3$$

That is, the combination with the interval t1 cancels out the f1 component of the background noise at the time of calculating arithmetic mean. Likewise, the combination with the interval t2 cancels out the f2 component, and the combination with the interval t3 cancels out the f3 component. Arithmetic mean of the first to eighth periods with the controlled sound reproduction intervals in this manner will cancel out all the f1, f2, and f3 components as peak frequency components of the background noise signal.

The following is a generalized description of the above idea. In step S203, this apparatus decides the number of periods and sound reproduction intervals of measurement signals based on this rule.

That is, if there are n processing targets, that is, peak frequency components f1 to fn of a background noise signal, the number of periods of measurement signals is set to $2^n$. Each sound reproduction interval tk between the first period and the $(2^{(k-1)}+1)$th period (k=1 to n) is set to tk=(1/fk)/2× (odd number), and the sound reproduction interval between the adjacent periods is set to be equal to or more than a minimum necessary sound reproduction interval t0. In addition, the respective sound reproduction intervals from the $(2^{(n-1)}+1)$th period to the $(2^n)$th period are set to be equal to the respective sound reproduction intervals between the first period to the $(2^{(n-1)})$th period.

In the case shown in FIGS. 5A and 5B, the peak frequencies are represented by f1, f2, and f3 in descending order. However, they can be numbered in an arbitrary order, for example, ascending order. In this case, since the intervals t1, t2, and t3 are associated with f1, f2, and f3, respectively, by equations (1), (2), and (4), and the respective sound reproduction intervals and the total sound reproduction interval (t3+t2+t1) vary depending on the manner of numbering. It is therefore possible to use the manner of numbering so as to minimize the total sound reproduction interval.

Since the necessary number of periods of measurement signals increases by the power of two depending on the number of peak frequencies, it is conceivable to limit the number of peak frequencies as processing targets in consideration of measurement times. In this case, only the upper limit number of peak frequencies against which countermeasures can be taken is preferentially selected from the peak frequencies detected in step S202. For example, peaks are selected in descending order of amounts by which they protrude from the approximate shape of the f characteristic of a background noise signal at the time of peak frequency detection. It is conceivable to preferentially select frequencies corresponding to integer multiples of a power supply frequency and the specifications of a mechanical driving unit (for example, the number of rotations of a hard disk) in consideration of main causes for peak frequency components. Alternatively, it is possible to preferentially select scale frequencies in consideration of the properties of a reproduced signal as a music signal.

In step S204, the system control unit 101 mainly operates to reproduce and pick up measurement signals based on the number of periods and generation intervals of measurement signals decided in step S203. The respective units designed to perform arithmetic processing in the controller 100 handle signals as discrete digital signals. For this reason, although the unit of generation intervals is [s] in the above description, [sample] obtained by multiplying this by a sampling frequency and rounding off the product is set as the unit of processing in actual digital signal processing.

First of all, the signal generation unit 112 generates measurement signals. As a signal for measuring the characteristic of a room, that is, an impulse response, an MLS (Maximum Length Sequence) or TSP (Time-Stretched Pulse) is generally used. It is possible to generate these measurement signals by simple mathematical expressions. However, the signal generation unit 112 need not generate measurement signals on site, and it is possible to store such signals in the storage unit 102 in advance and only read them out.

The system control unit 101 selects the latter one of the reproduced signal input unit 111 and the signal generation unit 112, and causes only the speaker 115L, of the speakers 115L and 115R, which is currently a driving target to generate the first period of a measurement signal. The filter application unit 113L need not perform any specific processing for the measurement signal and may let it pass through without any processing. Considering that the f characteristic of a random noise component of background noise generally falls to the right, the filter application unit 113L may add, for example, a measurement signal to a pink noise characteristic.

When starting to reproduce measurement signals, the apparatus stores the sound picked up by the microphone 121 as picked-up signals in the storage unit 102. That is, measurement signals reproduced as sound waves are picked up by the microphone 121 and recorded while indoor influences such as reflected and standing waves are convolved to the signals.

The apparatus then starts to reproduce a signal in the second period at a sound reproduction interval of the number of samples corresponding to t1 from the start of sound reproduction of the signal in the first period. The apparatus then starts to reproduce a signal in the third period at a sound reproduction interval of the number of samples corresponding to the (t2−t1) from the start of sound reproduction of the signal in the second period. Likewise, the apparatus reproduces measurement signals based on the number of periods and sound reproduction intervals of measurement signals decided in step S203, and finally terminates the acquisition of picked-up signals. The length of a picked-up signal acquired at this time is, for example, the sum (t3+t2+t1+t0) of a total sound reproduction interval (t3+t2+t1), the final period, and a reverberation component in the case shown in FIG. 5B.

Note that the minimum necessary sound reproduction interval t0 (minimum sound reproduction interval to) for making reverberation in the room cease is a pre-designated value. However, it is possible to decide this interval on site by monitoring a picked-up signal corresponding to the first period of a measurement signal. For example, the apparatus acquires the average level of background noise signals as (square sum of signal values)/(number of signal samples) in step S202. The apparatus decides t0 from the number of samples from the instant the apparatus starts monitoring a picked-up signal from a sample having passed the length of a measurement signal to the instant the envelope of a square signal value representing a reverberation component in the first period exponentially decreases and becomes buried in the average level of background noise signals.

The sound reproduction interval t0 decided in this manner includes a processing delay of the system which appears between the start of a picked-up signal and the first period and a sound wave propagation delay between the speaker and the microphone in addition to the length of a measurement signal and its reverberation component, and hence is a value with a slight margin. When deciding t0 during picking up of sound in the first period, the apparatus subsequently performs the processing in step S203 by using the sound reproduction interval t0. The apparatus then reproduces signals in the second and subsequent periods based on the decided number of periods and sound reproduction intervals of measurement signals. Note however that it is possible to early decide t0 by simple extrapolation prediction using the above envelope in consideration of the processing time in step S203.

In step S205, the signal analyzing and processing unit 103 calculates a start sample position at which a signal portion corresponding the first period of a measurement signal appears with respect to the picked-up signal acquired in step S204. More specifically, the signal analyzing and processing unit 103 calculates a cross-correlation with a measurement signal by using a sample nearly corresponding to the length of a measurement signal from the start of a picked-up signal. A measurement signal such as an MLS or TSP has a property that the auto-correlation becomes an impulse when $\tau=0$, and hence calculating an auto-correlation with a picked-up signal is equivalent to calculating an impulse response. The position of the peak of the impulse response is set as a start sample position. The impulse response calculated in this case has a base point at the start of a picked-up signal, and hence does not necessarily represent an accurate indoor characteristic. However, since the impulse response has a clear peak, it is used only to decide a start sample position.

Note that if the filter application unit 113L has added a pink noise characteristic to a measurement signal, an inverse filter is used to remove the characteristic before the calculation of an auto-correlation.

In step S206, the signal analyzing and processing unit 103 acquires an arithmetic mean signal by calculating arithmetic mean of the respective periodic signals of a picked-up signal corresponding to measurement signals in $2^n$ periods acquired by sound reproduction/picking up in step S204. That is, the signal analyzing and processing unit 103 extracts the respective periodic signals (for the respective periods) in a picked-up signal and calculates arithmetic mean of them by using the start sample position calculated in step S205 as a base point based on the sound reproduction intervals between the respective periods decided in step S203. At this time, the apparatus extracts the respective periods with a sample length corresponding to t0. Performing the arithmetic mean processing in step S206 will cancel out the peak frequency components of the background noise signal.

In step S207, the signal analyzing and processing unit 103 calculates an impulse response from the measurement signals and the arithmetic mean signal acquired in step S206. That is, the signal analyzing and processing unit 103 calculates an auto-correlation between the measurement signals and the arithmetic mean signal. However, since the arithmetic mean signal is obtained by using the start sample position calculated in step S205 as a base point, it is possible to obtain an impulse response accurately representing a room characteristic.

Note that a one-period component of a measurement signal in the above description may be the one obtained by coupling general measurement signals in a plurality of periods. In general, an auto-correlation is calculated in a frequency domain by using FFT. When using a measurement signal obtained by coupling a plurality of periods, it is possible to use circular convolution with the original measurement signal size before coupling. When coupling MLSs in a plurality of periods, it is possible to use fast hadamard transform (FHT) instead of FFT.

The storage unit 102 stores the impulse response calculated in this case in correspondence with a measurement point number (1=listening point) and the sound reproduction pattern of the speaker 115 (L or R).

Figure 3C:
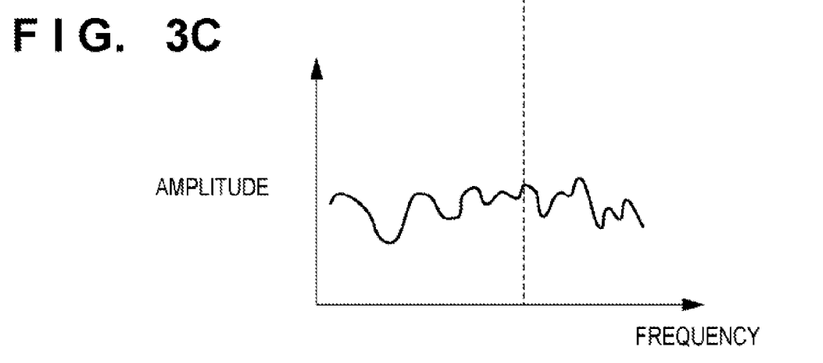
FIG. 3C is a graph for explaining the influence of the background noise peak frequency component on the f characteristic of the impulse response.

The f characteristic of the impulse response calculated in the above manner is free from a peak frequency component of the background noise signal like that shown in FIG. 3A, and hence the original characteristics based on the interaction between the speakers 115 and the room can be obtained, as shown in FIG. 3C.

A peak frequency component may appear in a picked-up signal when electrical noise having a peak frequency component directly enters the circuit of the controller 100 as well as when another electric device existing in the room serves as a noise source. That is, electrical noise enters a circuit portion implementing the function of a reproduction system, and appears in a picked-up signal when the speaker 115 reproduces sound. Furthermore, electrical noise directly appears in a picked-up signal when entering a circuit portion implementing the function of a sound pickup system. According to the principle of the present invention which has been described so far, since it is possible to cancel out peak frequency components appearing in a picked-up signal regardless of physical causes for them, the present invention is obviously effective for electrical noise like that described above.

In the above manner, this apparatus completes the measurement of an impulse response between the speaker 115L and the listening point in accordance with the flowchart of FIG. 2. Subsequently, the display unit 142 displays the message "measurement will be done at measurement point 1/R" which indicates the measurement of an impulse response between the speaker 115R and the listening point. The apparatus then causes only the speaker 115R to reproduce a sound signal, and performs processing up to the calculation of an impulse response in the same manner as described above. Depending on specifications for sound field correction, it is necessary to perform measurement at several points near a listening point as well as measurement at the listening point. Prominent peak frequency components of background noise signals vary depending on the measurement places and timings, the number of periods and sound reproduction intervals of measurement signals decided in step S203 change accordingly.

Upon completing the measurement of impulse responses at necessary measurement points, the signal analyzing and processing unit 103 combines the characteristics, generally the f characteristics, of the respective impulse responses stored in the storage unit 102 upon weighting them to generate a sound field correction filter designed to correct the characteristics. The filter coefficients of the sound field correction filter are stored in the storage unit 102 and are applied to reproduced signals in the filter application units 113L and 113R in the subsequent reproduction system processing performed upon selection of the reproduced signal input unit 111.

As described above, according to the first embodiment, it is possible to cancel out peak frequency components at the time of calculating arithmetic mean and obtain an accurate impulse response by controlling sound reproduction intervals of measurement signals in accordance with the peak frequency components of a background noise signal when measuring an impulse response.

Second Embodiment

In the first embodiment described above, since n independent sound reproduction intervals tk (k=1 to n) are introduced for n peak frequencies fk (k=1 to n), measurement signals in $2^n$ periods are required.

The second embodiment searches for sound reproduction intervals that allow to collectively process a plurality of peak frequencies as one processing target. That is, this embodiment regards n peak frequencies as m processing targets which are smaller in number than the n peak frequencies, and introduces m independent sound reproduction intervals to suppress the number of periods of measurement signals to $2^m$, thereby shortening the measurement time.

The basic principle of the present invention is that when calculating arithmetic mean of two signals, the interval between the two signals is controlled to cancel out a target peak frequency component of a background noise signal completely in theory. Consider a theoretically maximum amplitude A as an evaluation index for the peak frequency component of the background noise signal after arithmetic mean of the two signals are calculated. Superimposing (arithmetic mean) two sine waves having an amplitude of 1 and a phase difference can define a function of a peak frequency f and interval t as follows:

$$A(f,t)=\sqrt{((1+\cos(2\pi ft))/2)} \quad (6)$$

A=0 represents theoretically complete cancellation, and A=1 corresponds to a case in which no reduction is made.

Figure 6A:
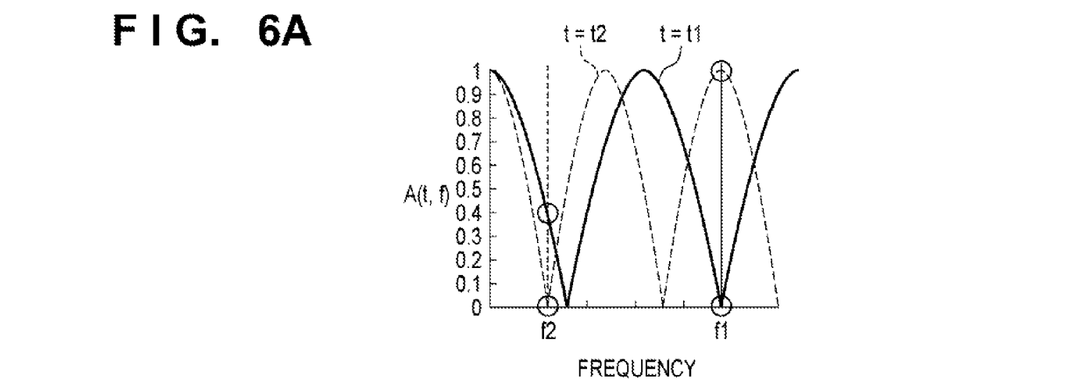
FIG. 6A is a graph for explaining the relationship between peak frequencies and the sound reproduction intervals in the second embodiment of the present invention.

The two comb plots shown in FIG. 6A indicate the maximum amplitude A described above for each frequency when interval t=t1 and t=t2, based on equation (6). The solid line corresponds to A(f, t1) with an interval t1, and the dotted line corresponds to A(f, t2) with an interval t2. It is obvious that the frequency (the dip frequency in a comb-like shape) to be canceled out at the time of calculating arithmetic mean changes depending on the interval t.

Assume that there are two peak frequencies f1 and f2 of a background noise signal. In this case, according to the idea of the first embodiment, the interval t1 is introduced to completely cancel out the f1 component [A(f1, t1)=0], and the interval t2 is introduced to completely cancel out the f2 component [A(f2, t2)=0]. As is obvious from "◯" in FIG. 6A, the f2 component is not sufficiently canceled out with the interval t1 [A(f2, t1)≠0], and the f1 component is not canceled out with the interval t2[A(f1, t2)≠0]. As described above, the first embodiment introduces one independent sound reproduction interval for one peak frequency, and hence requires measurement signal in $2^{(number\ of\ peaks)}$ periods.

However, the plot of the maximum amplitude A corresponding to a given interval t has a comb-like shape, and hence there are a plurality of dip frequencies fd(t) corresponding to A=0 (complete cancellation). Considering that fd(t) continuously changes in accordance with the interval t, the existence of the interval t can be expected, which allows to collectively cancel out a plurality of peak frequency components of a background noise signal at the time of calculating arithmetic mean of the two signals. According to equation (6), fd(t) can be written as $$fd(t)=1/(2t)\times(odd\ number) \quad (7)$$

Figure 6B:
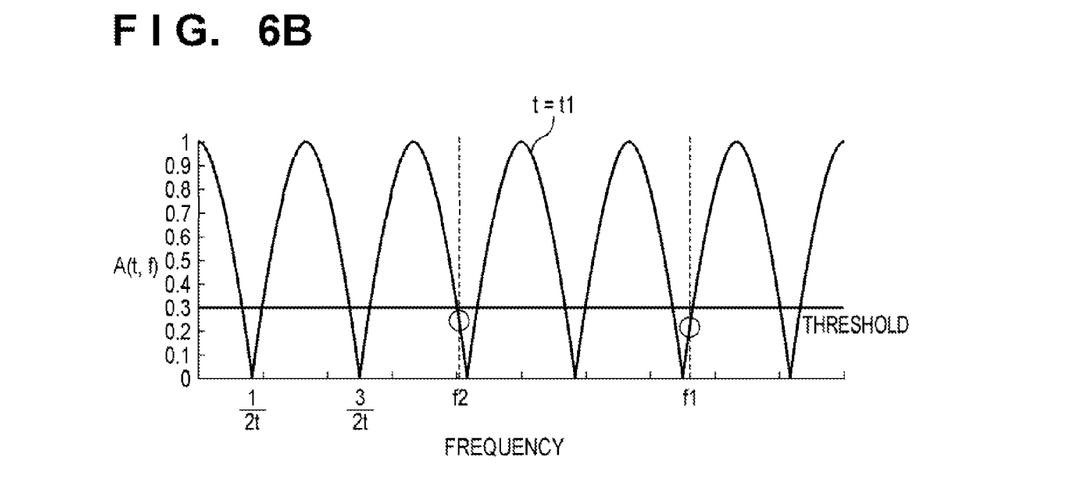
FIG. 6B is a graph for explaining the relationship between peak frequencies and the sound reproduction intervals in the second embodiment of the present invention.

That is, as shown in FIG. 6B, an odd number multiple of the fundamental frequency determined by 1/(2t) is a dip frequency for complete cancellation. Assume that the frequencies f1 and f2 are peak frequencies. In this case, if there is the interval t1 that makes each frequency become one of fd(t1), it is possible to collectively cancel out the f1 and f2 components at the time of calculating arithmetic mean of the two signals by only introducing one interval [A(f1, t1)=A(f2, t1)=0].

There is a high possibility that there is the interval t1 that makes the maximum amplitude A equal to or less than a threshold th at f1 and f2 in FIG. 6B and allows to collectively cancel out the f1 and f2 components to a sufficient degree, even though the two peak frequency components are not completely canceled out. This condition can be defined as follows, with th=0 corresponding to complete cancellation:

$$A(f1,t1)\leq th\ and\ A(f2,t1)\leq th \quad (8)$$

It is possible to decrease the required number of periods of measurement signals by searching for an interval that allows to collectively cancel out a plurality of peak frequency components and processing a plurality of peaks as one processing target.

Considering the above description, concrete processing in step S203 in the second embodiment will be described below.

Figure 7:
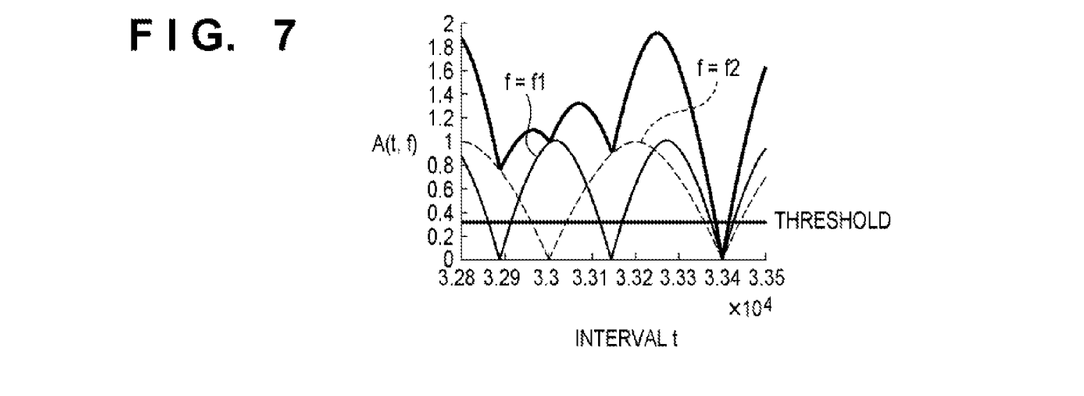
FIG. 7 is a graph for explaining a method of deciding the sound reproduction intervals of measurement signals according to the second embodiment of the present invention.

Consider, for example, a case in which the peak frequencies of a background noise signal detected in step S202 are two frequencies, that is, f1=189 Hz and f2=120 Hz. First of all, the maximum amplitude A is calculated at f=f1 and f=f2, based on expression (6), while the interval t1 is incremented. At this time, the initial value of t1 is set to t0 based on the condition of t1≥t0, and its upper limit value is set to, for example, 120% of t0 so as not to make the interval t1 too long. FIG. 7 is a graph showing the result of the above calculation when sampling frequency=48 kHz and t0=32800 samples. The solid line corresponds to A(f1, t1) of the frequency f1, and the dotted line corresponds to A(f2, t1) of the frequency f2. Obviously, the interval t1 changes the maximum amplitude A after calculating arithmetic mean of the respective peak frequency components. For the sake of descriptive convenience, FIGS. 6A and 6B show a case in which the intervals t1 and t2 are fixed, and the frequency f is changed. In contrast, in this case, the frequencies are fixed to the peak frequencies f1 and f2, and the interval t1 to be found is changed. As is obvious from the form represented by equation (6), the plots have the same comb-like shape regardless of which one of f and t is a variable.

As is obvious from FIG. 7, since the condition represented by expression (8) is satisfied before interval t1=33400 samples, the corresponding value may be used as t1. Note that the value of th may be decided by, for example, the amount by which the peak protrudes from the approximate shape of the f characteristic of a background noise signal at the time of peak detection, and different thresholds th1 and th2 may be introduced for each peak frequency. Alternatively, it is possible to introduce evaluation function E(t1) which is a scalar value like E(t)=A(f1, t1)+A(f2, t1) and select t1 that minimizes the evaluation function value within the range of changed t1. The thick line in FIG. 7 is a plot of E(t1). It is obvious that E(t1) takes the minimum value at interval t1=33400 samples. It is conceivable to use, as an evaluation function, for example, weighted coupling according to each peak frequency component as well as simple summation.

It is possible to decrease the number of periods of measurement signals from $2^2=4$ periods in the first embodiment to two periods by deciding the interval t1 that allows to collectively cancel out the f1 and f2 components and processing two peaks as one processing target.

Figure 8A:
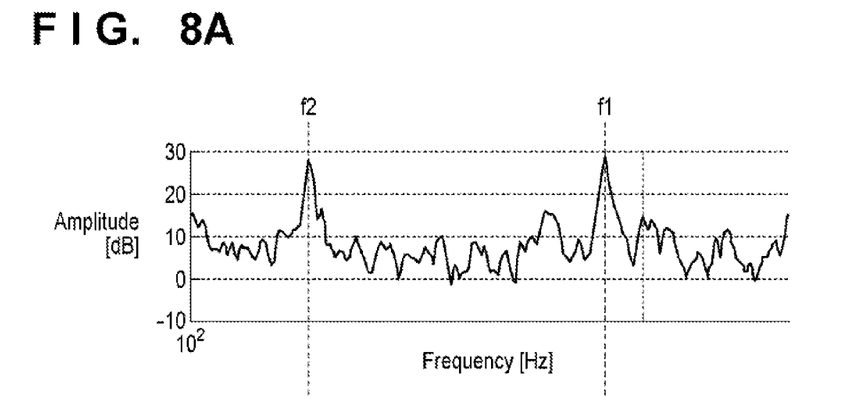
FIG. 8A is a graph showing an example of the comparison in noise reduction performance between the first and second embodiments of the present invention.
Figure 8B:
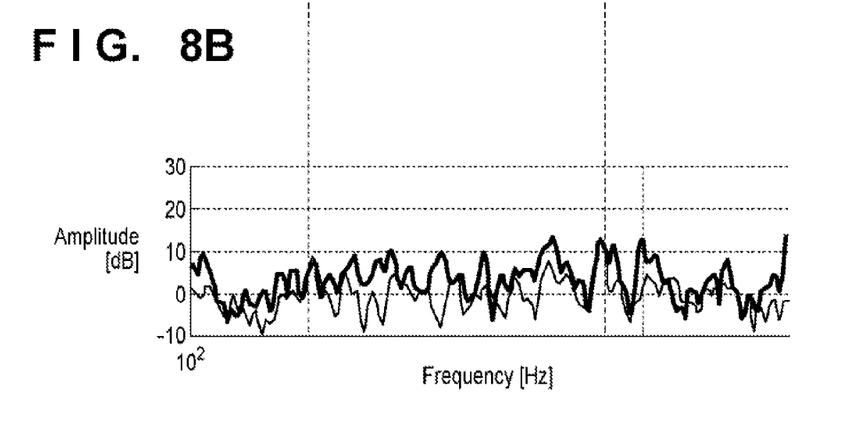
FIG. 8B is a graph showing an example of the comparison in noise reduction performance between the first and second embodiments of the present invention.

FIGS. 8A and 8B show comparison between noise reduction performance in the second embodiment and that in the first embodiment by using background noise signals including the above peak frequency components. FIG. 8A shows the f characteristic obtained by dividing a background noise signal once with a sample length of t0. This graph indicates that peaks appear at f1=189 Hz and f2=120 Hz.

The thick line in FIG. 8B shows the f characteristic obtained by deciding the interval t1 that allows to collectively cancel out the f1 and f2 components, dividing a background noise signal twice at the interval t1, and calculating arithmetic mean of the resultant signals based on the second embodiment. In contrast to this, the thin line in FIG. 8B shows the f characteristic obtained by introducing the independent intervals t1 and t2 for two peak frequencies, dividing a background noise signal a total of four times at the intervals t1, (t2−t1), and t1, and calculating arithmetic mean of the resultant signals based on the first embodiment. Obviously, since the number of signals to be used for arithmetic mean operation is reduced to half, the f characteristic in the second embodiment takes larger values as a whole and exhibits slightly lower reduction performance for random noise components than the f characteristic in the first embodiment. However, the second embodiment exhibits almost the same reduction performance for peak frequency components of a background noise signal, which is an important point of the present invention, as that of the first embodiment.

Consider next a case in which a background noise signal includes three peak frequencies, that is, frequencies f1, f2, and f3, as shown in FIG. 5A. As in the above case, the apparatus calculates A(f1, t1), A(f2, t1), and A(f3, t1) while incrementing the interval t1 with t0 being an initial value, and searches for the interval t1 that makes all the three values equal to or less than the threshold th. If there is no interval that simultaneously makes all the three values equal to or less than the threshold within the range in which t1 is changed, the apparatus selects the smallest one of the intervals t1 that simultaneously make two values equal to or less than the threshold. When, for example, selecting t1 that simultaneously makes A(f1, t1) and A(f2, t1) equal to or less than the threshold, the apparatus processes f1 and f2 of the three peak frequencies as one processing target. For the remaining one frequency f3, the apparatus calculates A(f3, t2) while incrementing the interval t2 with (t1+t0) being an initial value, and processes the frequency by introducing t2 that makes the value equal to or less than the threshold.

Note, however, that when newly introducing an independent sound reproduction interval tk, if the sound reproduction interval is targeted for one peak frequency, it is possible to set the value to an odd number multiple of the half period of the target frequency as in the first embodiment. Even if there is no t1 that simultaneously makes two values A equal to or less than the threshold, the interval t1 is targeted for one peak frequency.

Processing two of three peak frequencies as one processing target in this manner will regard the three peak frequencies as two processing targets which are smaller in number than the peak frequencies. This makes it possible to decrease the number of periods of measurement signals from $2^3=8$ periods in the first embodiment to $2^2=4$ periods in the second embodiment.

Figure 5C:
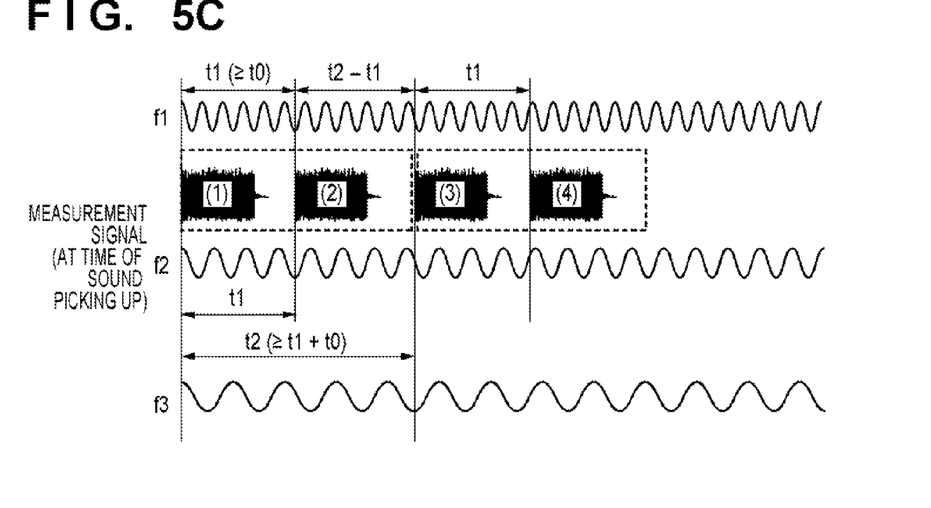
FIG. 5C is a graph for explaining a method of deciding the sound reproduction intervals of measurement signals according to the first embodiment of the present invention.

FIG. 5C schematically shows the idea of this embodiment in comparison with FIG. 5B in the first embodiment. Referring to expression (3), the f1 and f2 components are collectively canceled out by a combination with the interval t1 at the time of calculating arithmetic mean, and at the same time, the f3 component is canceled out by a combination with the interval t2. Although the sound reproduction intervals up to the fourth period are slightly long, since the number of periods is reduced to half that in the first embodiment, it is possible to greatly shorten the overall measurement time.

The following is a generalized description of the above idea. In step S203 in the second embodiment, this apparatus decides the independent sound reproduction interval tk based on this rule. The other portions are the same as those in the first embodiment.

First of all, the apparatus increments a variable k (initial value: 0) by one. The apparatus then calculates A(fj, tk) [j is a suffix of a peak frequency without countermeasures] while incrementing the interval tk with Σti[i=0 to (k−1)] being an initial value. The apparatus then selects the smallest one of the intervals tk that simultaneously make the values A(fj, tk) equal to or less than the threshold. In this case, the frequencies fj corresponding to A(fj, tk) which is equal to or less than the threshold are collectively processed as one processing target with the interval tk, and are excluded as those with countermeasures from the peak frequencies without countermeasures. Repeating these operations until no peak frequency without countermeasures remains (setting a final value k to m) can suppress the number of periods of measurement signals to $2^m$ by regarding n peak frequencies as m processing targets which are smaller in number than the peak frequencies.

As has been described above, the second embodiment can shorten the measurement time by suppressing the number of periods of measurement signals as well as having the effects described in the first embodiment.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-204864, filed Sep. 13, 2010, which is hereby incorporated by reference herein in its entirety.

What is claimed is:

1. An apparatus comprising:
an output unit arranged to output measurement sound signals in an acoustic space at an output interval;
an input unit arranged to input a plurality of picked-up signals picked up in the acoustic space during each of the measurement sound signals output by the output unit;
a processing unit arranged to obtain acoustic characteristics of the acoustic space from an arithmetic mean of the plurality of picked-up signals input by the input unit and the measurement signals; and
a control unit arranged to measure background noise in the acoustic space and detect a peak frequency component of a frequency characteristic of the background noise signal,
wherein the processing unit is arranged to control the output interval of measurement sound signals output by said output unit so as to cancel out the peak frequency component in a result of the arithmetic mean of the plurality of picked-up signals.

2. The apparatus according to claim 1, wherein when setting the number of periods of the measurement signals to 2n if peak frequency components detected by said control unit include n processing targets f1 to fn, said processing unit decides the number of periods and sound reproduction intervals of the measurement signals such that each sound reproduction interval tk (k=1 to n) between a first period and a (2(k−1)+1)th period becomes tk=(1/fk)/2×(odd number), and a sound reproduction interval between adjacent periods becomes not less than a designated minimum sound reproduction interval t0, while the respective sound reproduction intervals from a (2(n−1)+1)th period to a (2n)th period become equal to the respective sound reproduction intervals from the first period to a (2(n−1))th period.

3. The apparatus according to claim 2, wherein said processing unit is arranged to decide the sound reproduction interval tk that is configured to collectively cancel out a plurality of peak frequency components by using a maximum amplitude after calculating the arithmetic mean of peak frequency components as an evaluation index and collectively processes the plurality of peaks as the one processing target.

4. A method comprising:
an output step of causing an output unit to output measurement sound signals in an acoustic space at an output interval;
an input step of causing input unit to input a plurality of picked-up signals picked up in the acoustic space during each of the measurement sound signals output in the output step;
a processing step of causing a processing unit to obtain acoustic characteristics of the acoustic space from an arithmetic mean of the plurality of picked-up signals input in the input step and the measurement signals; and
a control step of causing a control unit to measure background noise in the acoustic space and detect a peak frequency component of a frequency characteristic of the background noise signal,
wherein in the processing step, the output interval of measurement sound signals output in the output step is controlled so as to cancel out the peak frequency component in a result of the arithmetic mean of the plurality of picked-up signals.

5. The method according to claim 4, wherein when setting the number of periods of the measurement signals to 2n if peak frequency components detected by said control unit include n processing targets f1 to fn, said processing unit decides the number of periods and sound reproduction intervals of the measurement signals such that each sound reproduction interval tk (k=1 to n) between a first period and a (2(k−1)+1)th period becomes tk=(1/fk)/2×(odd number), and a sound reproduction interval between adjacent periods becomes not less than a designated minimum sound reproduction interval t0, while the respective sound reproduction intervals from a
(2(n−1)+1)th period to a (2n)th period become equal to the respective sound reproduction intervals from the first period to a (2(n−1))th period.

6. The method according to claim 5, wherein it is decided that the sound reproduction interval tk that is configured to collectively cancel out a plurality of peak frequency components by using a maximum amplitude after calculating the arithmetic mean of peak frequency components as an evaluation index and collectively processes the plurality of peaks as the one processing target.

7. A non-transitory computer readable storage medium storing a program for causing a computer to function as:
an output unit arranged to output measurement sound signals in an acoustic space at output intervals;
an input unit arranged to input a plurality of picked-up signals picked up in the acoustic space during each of the measurement sound signals output by the output unit;
a processing unit arranged to obtain acoustic characteristics of the acoustic space from an arithmetic mean of the plurality of picked-up signals input by the input unit and the measurement signals; and
a control unit arranged to measure background noise in the acoustic space and detect a peak frequency component of a frequency characteristic of the background noise signal,
wherein the processing unit is arranged to control the output interval of measurement sound signals output by said output unit so as to cancel out the peak frequency component in a result of the arithmetic mean of the plurality of picked-up signals.

8. The apparatus according to claim 1, wherein the processing unit controls output interval of a first measurement signal and a second measurement signal output by the output unit so as to have opposite phases at the time of calculating the arithmetic mean, between a peak frequency component of the background noise signal of a first picked-up signal input by the input unit during the first measurement signal output by the output unit and a peak frequency component of the background noise signal of a second picked-up signal input by the input unit during the second measurement signal output by the output unit.

9. The apparatus according to claim 1, wherein the processing unit controls the number of output times of the measurement signal according to the number of peak frequency component of the background noise signal.

* * * * *